(Specimens.)
N. BOUVANG.
PHOTOGRAPHIC OPAQUE NEGATIVE AND PROCESS OF PRINTING THEREFROM.
No. 603,936. Patented May 10, 1898.
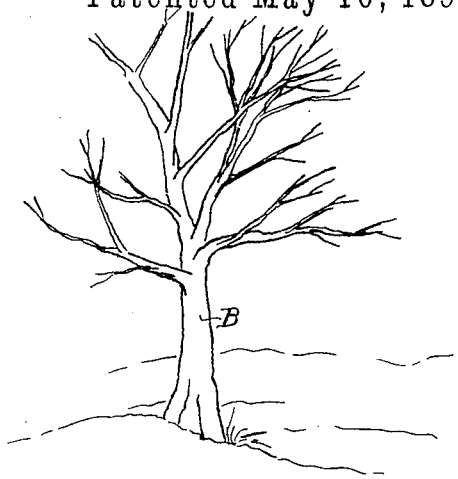
Fig. 1.
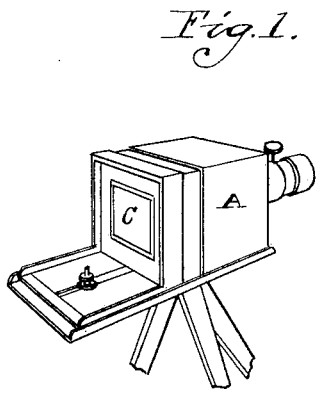
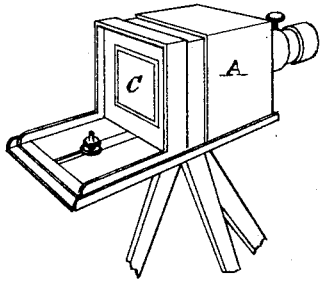
Fig. 2.
Fig. 3.
Fig. 4.
Witnesses:
E. F. Dowling.
L. J. Monahan.
Inventor:
Nels Bouvang
Per Morrison Miller
Att'ys.
THE NORRIS PETERS CO., PHOTO-LITHO., WASHINGTON, D. C.

UNITED STATES PATENT OFFICE.

NELS BOUVANG, OF ROCKFORD, ILLINOIS.

PHOTOGRAPHIC OPAQUE NEGATIVE AND PROCESS OF PRINTING THEREFROM.

SPECIFICATION forming part of Letters Patent No. 603,936, dated May 10, 1898.

Application filed October 30, 1897. Serial No. 656,865. (Specimens.)

*To all whom it may concern:*

Be it known that I, NELS BOUVANG, a citizen of the United States, residing at Rockford, in the county of Winnebago and State of Illinois, have invented certain new and useful Improvements in the Art of Photography, of which the following is a specification.

My invention relates particularly to a method of producing photographs from and by the use of an opaque negative.

In the art of photography as heretofore practiced the negative-film has been provided with a backing of glass, celluloid, or other transparent substance and the positive print has been produced by passing light through the negative and its backing to the sensitized surface prepared for the positive. Glass has been most commonly used for the backing, though its cost, its fragile nature, and its weight have been serious objections to its use. The glass, too, must be clear and its surface smooth or the prints from the negative will appear distorted and indistinct, and the refraction of the light in passing through it has a tendency in the same direction.

In the method of photography which I will describe herein the negative is not transparent, but is opaque. Light does not pass through it, but is reflected from the surface of its backing to the sensitized paper prepared to receive the positive. This negative is prepared by treating the light-reflecting surface of an opaque substance with a rapid sensitized emulsion.

Some of the advantages possessed by my process over the methods commonly practiced are the considerable reduction in the cost of negatives, the greater simplicity in the process of developing, and the greater ease and safety in handling and carrying them, (particularly over glass negatives, which are especially fragile and quite heavy when several plates are carried, as in the ordinary amateur's camera.)

In the accompanying drawings, Figure 1 is a perspective representation of the manner of obtaining the negative—to wit, the exposure of the sensitized paper in a camera of common form. Fig. 2 is a like view showing the manner of producing the positive print upon the sensitized paper. In this operation a photographic copy is made from the negative, using the camera and the same kind of sensitive paper as in the production of the negative. Fig. 3 is a view of the positive print obtained by the operation illustrated in Fig. 2. Fig. 4 is a transverse section, greatly enlarged, through the sensitized paper and its card backing, showing the emulsion on the face of the paper.

In the production of this negative I have employed a paper having a specially-prepared pure-white filled and glazed surface, spreading upon that surface as evenly as possible an extremely rapid sensitive emulsion. The paper is made practically opaque by backing it with black or by affixing it to a piece of cardboard. This completes the sensitive surface, which is ready for the ordinary exposure in the camera, after which it is developed and fixed by the usual process. With my sensitive surface this process is much simplified, however, over the old way, owing to the fact that the image on the sensitive surface is developed and remains as clear and distinct as in the finished photograph, instead of fading away, as it does when developing the ordinary negative. This renders it easy for the amateur to determine when the development has been carried to the proper point. Where the transparent negative is used, the matter of a proper development is a question involving considerable skill and judgment, acquired only by long practice and usually after repeated failures. As soon as the negative comes from the fixing-bath and is properly dried it is ready for the reproducing or printing process, wherein it is placed in the proper light, so that the rays may be reflected from the white filled and glazed surface of the paper to the sensitized paper prepared to receive the positive print. I have done this printing by placing the sensitized paper in the camera, and after the latter has been properly focused upon the negative print after print may be made with great rapidity. These prints are treated to the usual bath and prepared in the same manner as in the methods heretofore employed.

A is a camera of common form.

B is the object to be photographed upon the sensitized paper.

C is the sensitized paper.

D is the negative produced by the exposure of the sensitized paper in the camera A, as in Fig. 1.

E is the positive print produced by the exposure in a camera of the sensitized paper to the negative, as illustrated in Fig. 2.

F is the card backing for the sensitized paper, and G is the sensitive emulsion on its face.

I have found that one kind of sensitized paper will answer for both positive and negative prints.

I claim as my invention—

1. A new process of photography, consisting in producing a negative by spreading a sensitive emulsion upon the reflecting-surface of a substantially opaque substance, exposing the prepared surface, as in a camera and causing the light to be reflected from the reflecting-surface of the negative thus produced to a sensitized surface, to produce the positive print.

2. A new process of photography, consisting in producing a negative by spreading a sensitive emulsion upon the pure-white glazed surface of a substantially opaque substance, exposing the prepared surface, as in a camera, developing and fixing the negative, and causing the light to be reflected from the white glazed surface of the negative to a sensitized surface to produce the positive prints.

3. A new process of photography consisting in producing a negative by spreading a sensitive emulsion upon the pure-white filled and glazed surface of paper, exposing the prepared surface, as in a camera, developing and fixing the negative, and causing the light to be reflected from the white glazed surface of the negative to a sensitized surface to produce the positive prints.

4. As a new article of manufacture, an opaque backing having a light-reflecting surface, having thereon a photographically-prepared film negative of an original object.

5. As a new article of manufacture, an opaque backing, having a pure-white glazed surface, having thereon a photographically-prepared film negative of an original object.

6. As a new article of manufacture an opaque backing having a pure-white filled and glazed surface, having thereon a photographically - prepared film negative of an original object.

NELS BOUVANG.

Witnesses:
L. L. MILLER,
NELLIE BUNKER.